US012624815B2

(12) United States Patent
Onotsuka

(10) Patent No.: US 12,624,815 B2
(45) Date of Patent: May 12, 2026

(54) VEHICLE LAMP

(71) Applicant: STANLEY ELECTRIC CO., LTD., Tokyo (JP)

(72) Inventor: Takaaki Onotsuka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/085,852

(22) Filed: Mar. 20, 2025

(65) Prior Publication Data

US 2025/0297721 A1 Sep. 25, 2025

(30) Foreign Application Priority Data

Mar. 21, 2024 (JP) ................................ 2024-045517

(51) Int. Cl.

*F21S 43/239* (2018.01)
*F21S 43/19* (2018.01)
*F21S 43/245* (2018.01)
*F21S 43/249* (2018.01)
*F21S 43/31* (2018.01)
*F21Y 113/13* (2016.01)
*F21Y 115/10* (2016.01)

(52) U.S. Cl.

CPC ............ *F21S 43/239* (2018.01); *F21S 43/19* (2018.01); *F21S 43/245* (2018.01); *F21S 43/249* (2018.01); *F21S 43/315* (2018.01); *F21Y 2113/13* (2016.08); *F21Y 2115/10* (2016.08)

(58) Field of Classification Search

CPC ....... F21S 43/239; F21S 43/249; F21S 43/315
See application file for complete search history.

(56) References Cited

U.S. PATENT DOCUMENTS 10,578,271 B1 * 3/2020 Chen ....................... F21S 43/26
11,644,174 B2 * 5/2023 Horikawa ............. F21S 43/245 362/511
2014/0376245 A1 * 12/2014 Ritter .................... F21S 43/239 362/511
2022/0260228 A1 * 8/2022 Thaliath .................. F21S 43/40

FOREIGN PATENT DOCUMENTS

JP 2018-120683 A 8/2018

* cited by examiner

*Primary Examiner* — Eric T Eide
(74) *Attorney, Agent, or Firm* — KENEALY VAIDYA LLP

(57) ABSTRACT

A vehicle lamp comprising: a light source; a light guide which includes: a first plate-shaped light guide section, which includes an emission surface directed toward the light irradiation direction and a surface opposite to the emitting surface, on which a lens cut for extracting light is formed; a second plate-shaped light guide section, which extends from one edge of the first plate-shaped light guide section toward the light source and guides the light emitted from the light source to the edge of the first plate-shaped light guide section; and an incident surface, which is provided at the end of the second plate-shaped light guide section facing the light source and into which the light emitted from the light source enters.

3 Claims, 6 Drawing Sheets

INSIDE IN VEHICLE WIDTH DIRECTION ↔ OUTSIDE IN VEHICLE WIDTH DIRECTION

VEHICLE LAMP

INCORPORATION BY REFERENCE

This application is based upon and claims the benefit of priority from Japanese patent application No. 2024-045517, filed on Mar. 21, 2024, the disclosure of which is incorporated herein in its entirety by reference.

BACKGROUND ART

The present disclosure relates to a vehicle lamp.

A vehicle lamp is known, which includes a plurality of light sources arranged in a row at regular intervals from the inner side to the outer side in the vehicle width direction, and a light guide disposed in front of the plurality of light sources, and is configured to guide light from the plurality of light sources by the light guide (for example, see Patent Literature 1).

[Patent Literature 1] Japanese Unexamined Patent Application Publication No. 2018-120683

SUMMARY

However, in Patent Literature 1, when a Lambertian light distribution light source arranged in a concentrated manner at one location is used as the light source, the light emitted from the Lambertian light distribution light source is relatively bright near the optical axis and becomes relatively dim as the distance from the optical axis increases. Therefore, there is a problem in that it is difficult to cause the light guide to emit light uniformly (or substantially uniformly).

This disclosure has been made to solve such a problem, and an object of the present disclosure is to provide a vehicle lamp capable of allowing a light guide to emit light uniformly (or substantially uniformly) even when a Lambertian light distribution light source arranged in a concentrated manner at one location is used as the light source.

A vehicle lamp according an example aspect of the present disclosure includes: a light source; a light guide which includes: a first plate-shaped light guide portion, which comprises an emission surface directed toward the light irradiation direction and an opposite surface on which a lens cut for extracting light is formed; a second plate-shaped light guide portion, which extends from one edge of the first plate-shaped light guide portion toward the light source and guides the light emitted from the light source to the edge of the first plate-shaped light guide portion; and an incident surface, which is provided at an end of the second plate-shaped light guide portion facing the light source and into which the light from the light source enters; wherein the second plate-shaped light guide portion includes one side surface, which is disposed on one side with respect to the optical axis of the light source, and the other side surface, which is disposed on the other side with respect to the optical axis of the light source, the one side surface includes a first side surface, which is disposed close to the incident surface, and a second side surface, which is disposed far from the incident surface, the first side surface is a first total reflection surface that totally reflects, toward the other side surface, the relatively bright light on one side with respect to the optical axis of the light source, among the light from the light source that has entered from the incident surface, the other side surface is a second total reflection surface that totally reflects, toward one edge of the first plate-shaped light guide portion, the totally reflected light from the first total reflection surface, the relatively bright light on one side with respect to the optical axis of the light source among the light from the light source that has entered from the incident surface is first totally reflected by the first total reflection surface and then, in this order, totally reflected by the second total reflection surface, after which the light enters the first plate-shaped light guide portion through the edge of the first plate-shaped light guide portion, is guided within the first plate-shaped light guide portion, where it is totally reflected by a lens cut formed on the opposite surface of the emission surface, and is emitted from the emission surface, and the relatively bright light on the other side with respect to the optical axis of the light source among the light from the light source that has entered from the incident surface enters the first plate-shaped light guide portion through the edge of the first plate-shaped light guide portion, is guided within the first plate-shaped light guide portion, where it is totally reflected by a lens cut formed on the opposite surface of the emission surface, and is emitted from the emission surface.

With this configuration, even when a Lambertian light distribution light source arranged in a concentrated manner at one location is used as the light source, it is possible to allow a light guide to emit light uniformly (or substantially uniformly).

In the above vehicle lamp, the light source may include at least two light sources that emit different light colors and are arranged in the thickness direction of the second plate-shaped light guide portion.

In the above vehicle lamp, the light source may include at least two light sources that emit different light colors and are arranged in a direction intersecting the thickness direction of the second plate-shaped light guide portion.

According to the present disclosure, it is possible to provide a vehicle lamp capable of allowing a light guide to emit light uniformly (or substantially uniformly) even when a Lambertian light distribution light source arranged in a concentrated manner at one location is used as the light source.

The above and other objects, features and advantages of the present disclosure will become more fully understood from the detailed description given hereinbelow and the accompanying drawings.

DESCRIPTION OF EMBODIMENT

Figure 1:
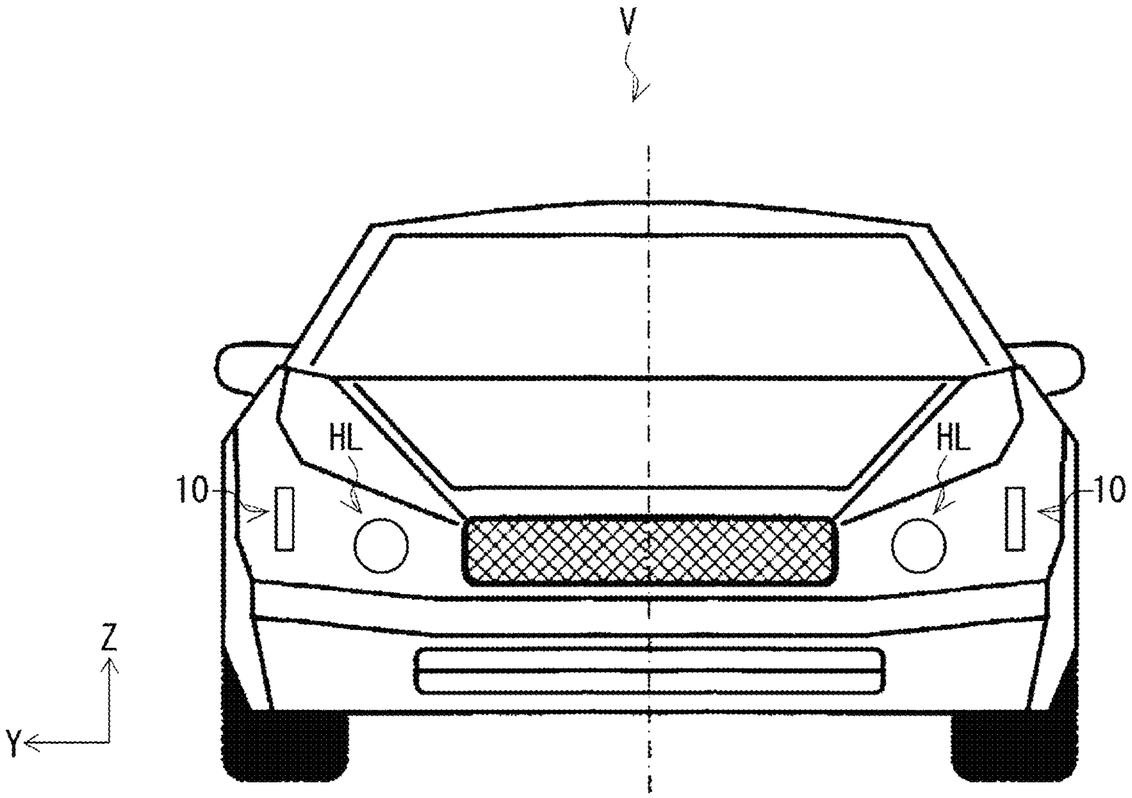
FIG. 1 is a front view of a vehicle V on which a vehicle lamp 10 is mounted.

Hereinafter, a vehicle lamp 10 according to an embodiment of the present disclosure will be described below with reference to the accompanying drawings. In the drawings, corresponding components are denoted by the same reference numerals, and redundant descriptions are omitted.

FIG. 1 is a front view of a vehicle V on which a vehicle lamp 10 is mounted.

The vehicle lamp 10 of the present embodiment is a vehicle signal lamp that functions as a DRL lamp, position lamp, or turn lamp. As shown in FIG. 1, the vehicle lamp 10 is mounted on both left and right sides of the front end of a vehicle V, such as an automobile. In FIG. 1, the reference numeral HL represents a headlamp.

Since the vehicle lamp 10 mounted on both the left and right sides has a symmetrical configuration, the vehicle lamp 10 mounted on the left side of the front end of the vehicle V (left side when viewed from the front of the vehicle) will be described as a representative example. For convenience of explanation, the XYZ axes are defined. The X-axis extends in the longitudinal direction of the vehicle, the Y-axis extends in the vehicle width direction, and the Z-axis extends in the vertical direction.

Figure 2A:
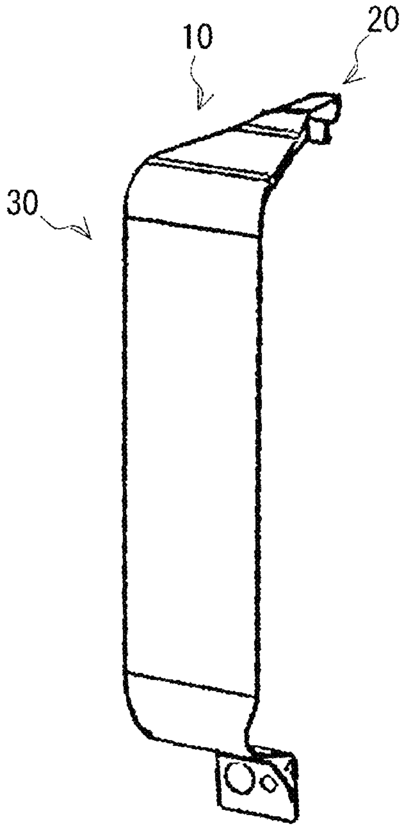
FIG. 2A is a perspective view of the vehicle lamp 10.
Figure 2B:
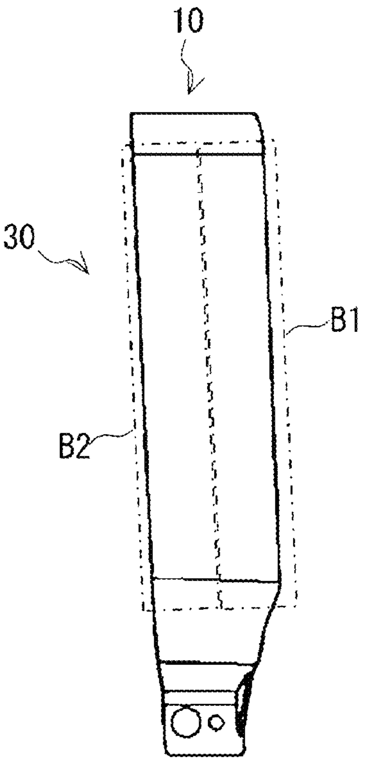
FIG. 2B is a front view of the vehicle lamp 10.
Figure 3:
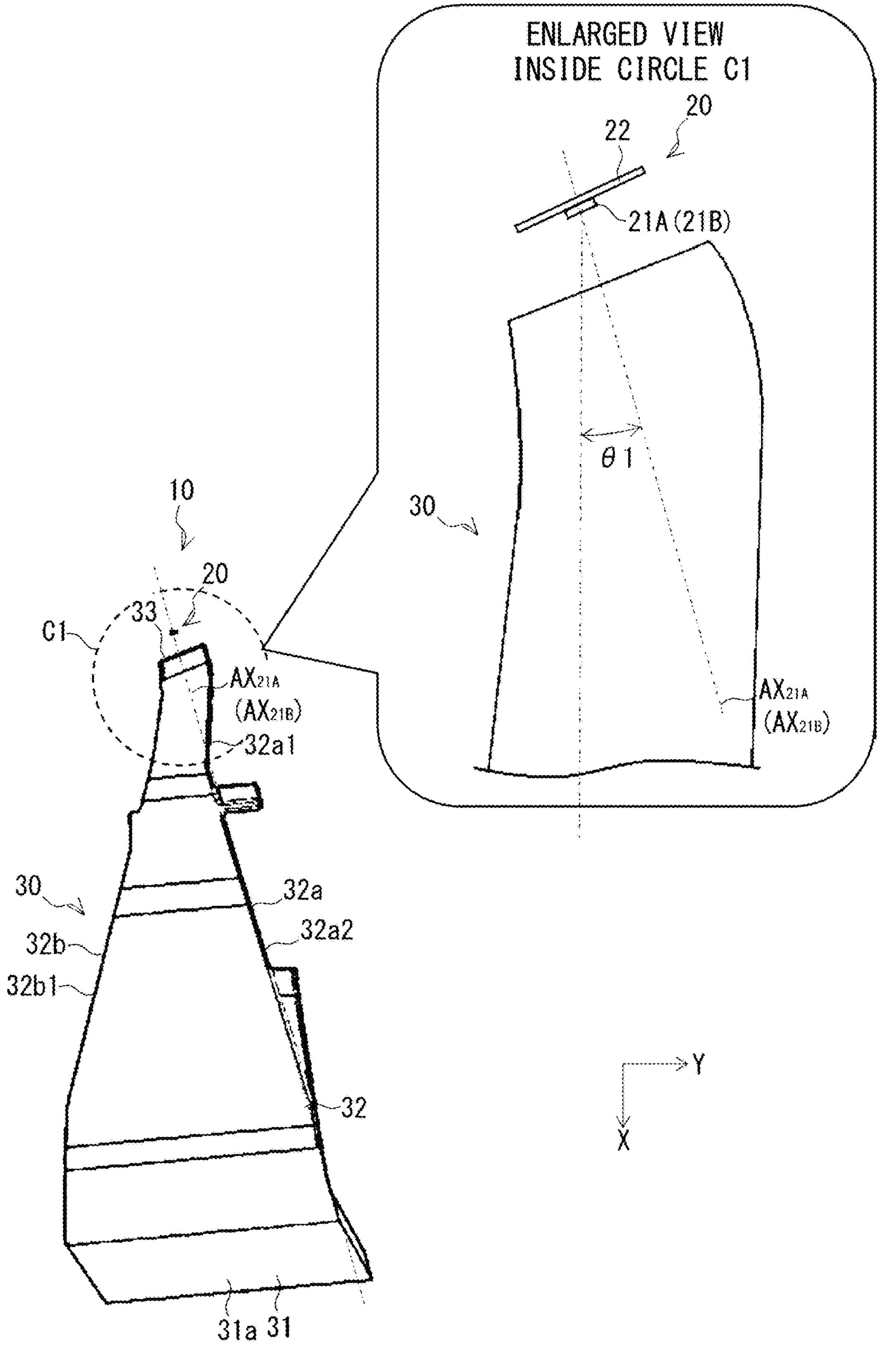
FIG. 3 is a top view of the vehicle lamp 10.
Figure 4:
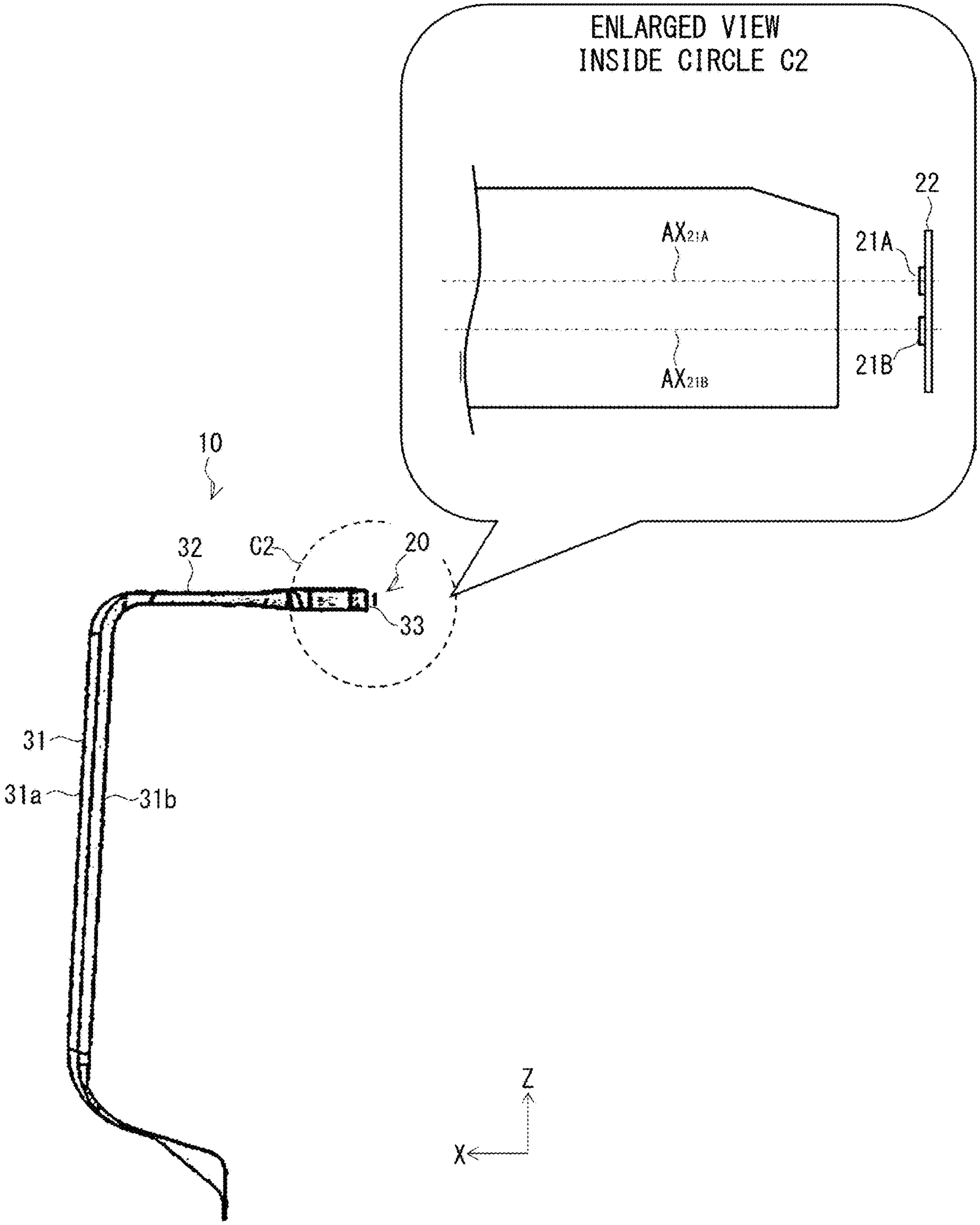
FIG. 4 is a side view of the vehicle lamp 10.

FIG. 2A is a perspective view of the vehicle lamp 10, FIG. 2B is a front view, FIG. 3 is a top view, and FIG. 4 is a side view.

As shown in FIGS. 2A to 4, the vehicle lamp 10 includes a light source 20 and an inner lens 30.

The light source 20 includes a first light source 21A and a second light source 21B. As shown in FIG. 4, the first light source 21A and the second light source 21B are mounted on a substrate 22 with a spacing in the Z-direction (thickness direction of the second plate-shaped light guide section 32).

The first light source 21A is, for example, a semiconductor light-emitting element having Lambertian light distribution characteristics, such as an LED that emits white light. The first light source 21A is provided with an emitting surface (for example, a rectangular emitting surface having a size of 1 mm×1 mm). The optical axis AX21A of the first light source 21A passes through the center of the emitting surface and extends in a direction perpendicular to the emitting surface. On the other hand, the second light source 21B is, for example, a semiconductor light-emitting element having Lambertian light distribution characteristics, such as an LED that emits amber-colored light. The second light source 21B is also provided with an emitting surface (for example, a rectangular emitting surface having a size of 1 mm×1 mm). The optical axis AX21B of the second light source 21B passes through the center of the emitting surface and extends in a direction perpendicular to the emitting surface.

The substrate on which the first light source 21A and the second light source 21B are mounted is attached to a housing (not shown) or the like in a state where, in top view, the optical axis AX21A of the first light source 21A (and the optical axis AX21B of the second light source 21B) is inclined at an angle θ1 with respect to the X-axis.

As described above, the light source 20 (the first light source 21A and the second light source 21B) is arranged in a concentrated manner at a single location due to installation space constraints. Here, "a single location" refers to a configuration in which the spacing between the light sources is approximately 5 mm or less, with the exact spacing being appropriately adjusted in accordance with the shape and size of the incident surface 33 of the inner lens 30. Additionally, in order to ensure that the light emitted from each light source follows the same optical path, it is preferable that the light sources be arranged as close to each other as possible.

The inner lens 30 is disposed in front of the first light source 21A and the second light source 21B.

The inner lens 30 (an example of a light guide in the present disclosure) is a light guide that guides light from the first light source 21A and the second light source 21B. The inner lens 30 is made of a transparent resin such as acrylic or polycarbonate.

As shown in FIG. 4, the inner lens 30 includes a first plate-shaped light guide portion 31, which comprises an emission surface 31*a* directed toward the light irradiation direction and an opposite surface 31*b* on which a lens cut (not shown) for extracting light is formed, a second plate-shaped light guide portion 32, which extends from one edge (the upper edge in FIG. 4) of the first plate-shaped light guide portion 31 toward the light source 20 and guides the light emitted from the light source 20 to the edge of the first plate-shaped light guide portion 31, and an incident surface 33, which is provided at an end of the second plate-shaped light guide portion 32 facing the light source 20 and into which the light from the light source 20 enters. The incident surface 33 is a planar shape that is perpendicular to the optical axis of the light source 20 (the optical axis AX21A of the first light source 21A (and the optical axis AX21B of the second light source 21B)).

As shown in FIG. 3, the second plate-shaped light guide portion 32 includes one side surface 32*a*, which is disposed on the outer side in the vehicle width direction, and the other side surface 32*b*, which is disposed on the inner side in the vehicle width direction, in a top view.

The one side surface 32*a* includes a first side surface 32*a*1, which is disposed close to the incident surface 33, and a second side surface 32*a*2, which is disposed far from the incident surface 33.

The first side surface 32*a*1 is a first total reflection surface that totally reflects, toward the other side surface 32*b*, the light (see Ray2*a* and Ray2*b* in FIG. 5B) on one side (the outer side in the vehicle width direction) with respect to the optical axis of the light source 20 (the optical axis AX21A of the first light source 21A (and the optical axis AX21B of the second light source 21B)) in a top view, among the light from the light source 20 that has entered from the incident surface 33.

As shown in FIG. 3, the first side surface 32*a*1 (first total reflection surface) extends from one side (the outer side in the vehicle width direction) of the incident surface 33 toward the front of the vehicle and the inner side in the vehicle width direction, and in a top view, intersects with the optical axis of the light source 20 (the optical axis AX21A of the first light source 21A (and the optical axis AX21B of the second light source 21B)). The second side surface 32*a*2 extends, in a top view, from one side (the outer side in the vehicle width direction) of the incident surface 33 along the optical axis of the light source 20 (the optical axis AX21A of the first light source 21A (and the optical axis AX21B of the second light source 21B)) to one side (the outer side in the vehicle width direction) of the edge of the first plate-shaped light guide portion 31, so that the light from the light source 20 that has entered from the incident surface 33 is guided within the second plate-shaped light guide portion 32 directly to the edge of the first plate-shaped light guide portion 31 without being incident on the second side surface 32*a*2.

On the other hand, the other side surface 32*b* is a second total reflection surface that totally reflects, toward one edge of the first plate-shaped light guide portion 31, the totally reflected light (see Ray2*a* and Ray2*b* in FIG. 5B) from the first total reflection surface 32*a*1.

The other side surface 32*b* extends in a direction generally parallel to the first side surface 32*a*1, from the other side (the inner side in the vehicle width direction) of the incident surface 33 to the other edge (the inner side in the vehicle width direction) of the first plate-shaped light guide portion 31.

In the vehicle lamp 10 having the above configuration, a DRL lamp (or a position lamp) can be realized by turning on the first light source 21A, which emits white light. On the other hand, a turn lamp can be realized by turning on the second light source 21B, which emits amber-colored light.

The light path of the light emitted by the first light source 21A and the light path of the light emitted by the second light source 21B are the same. Hereinafter, the light path of the light emitted by the first light source 21A will be described as a representative example.

Figure 5A:
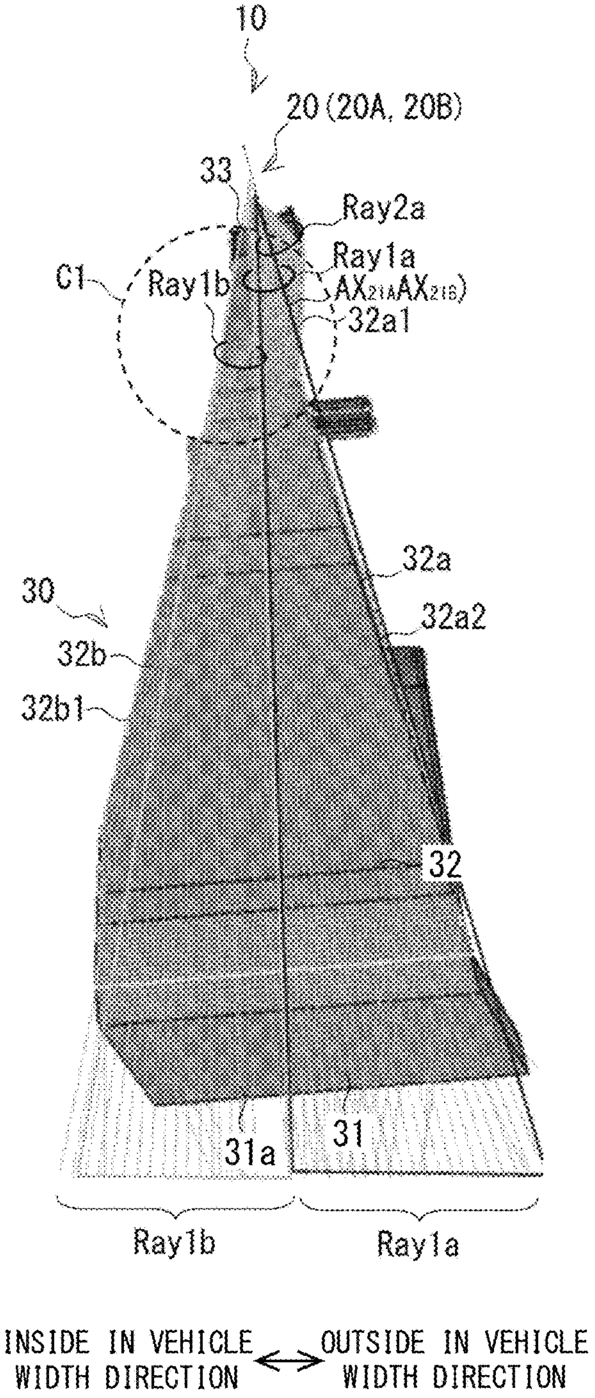
FIG. 5A is a figure in which the light paths of the light emitted by the light source 20 are indicated in a top view of the vehicle lamp 10.
Figure 5B:
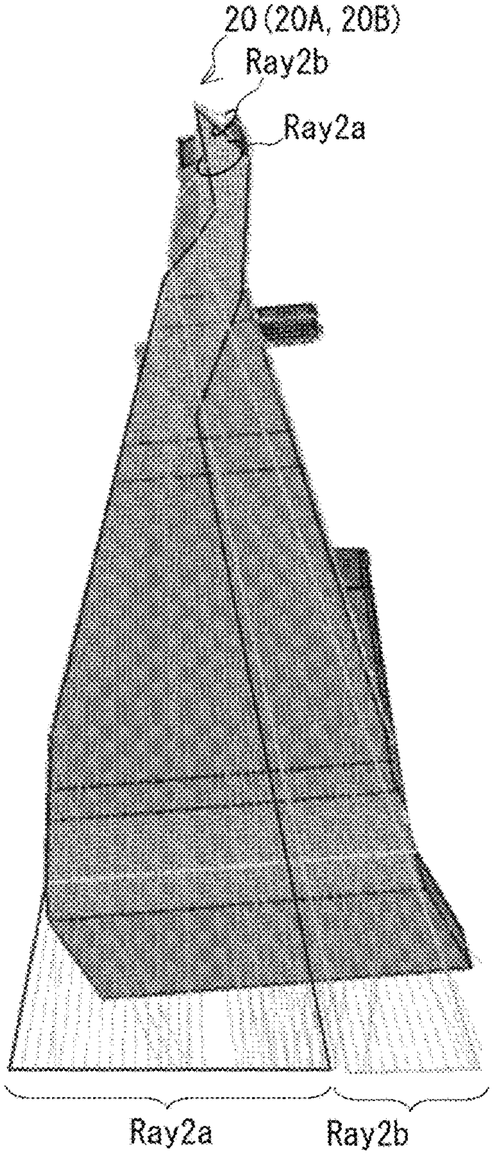
FIG. 5B is a figure in which the light paths of the light emitted by the light source 20 are indicated in a top view of the vehicle lamp 10.

FIG. 5A and FIG. 5B are figures in which the light paths of the light emitted by the light source 20 are indicated in a top view of the vehicle lamp 10.

When the first light source 21A is turned on, the light emitted by the first light source 21A enters the second plate-shaped light guide portion 32 from the incident surface 33, as shown in FIG. 5A. At this time, the light emitted by the first light source 21A is slightly condensed by the action of the incident surface 33, but even after entering the second plate-shaped light guide portion 32, it retains its Lambertian characteristics.

As shown in FIG. 5A, relatively bright light Ray1*a* (light within a half-value angle of 60 degrees) on the other side (the inner side in the vehicle width direction) with respect to the optical axis AX21A of the first light source 21A in a top view among the light from the first light source 21A that has entered from the incident surface 33 travels directly toward one edge of the first plate-shaped light guide portion 31 as direct light, without being incident on either the one side surface 32*a* or the other side surface 32*b*, enters the first plate-shaped light guide portion 31 through the edge of the first plate-shaped light guide portion 31, is guided within the first plate-shaped light guide portion 31, is totally reflected by a lens cut (not shown) formed on the opposite surface 31*b* of the emission surface 31*a*, and is emitted from the emission surface 31*a* (mainly from the rectangular area B1 in FIG. 2(*b*)).

Similarly, relatively dim light Ray1*b* (light outside a half-value angle of 60 degrees) on the other side (the inner side in the vehicle width direction) with respect to the optical axis AX21A of the first light source 21A in a top view among the light from the first light source 21A that has entered from the incident surface 33 travels directly toward one edge of the first plate-shaped light guide portion 31 as direct light, without being incident on either the one side surface 32*a* or the other side surface 32*b*, enters the first plate-shaped light guide portion 31 through the edge of the first plate-shaped light guide portion 31, is guided within the first plate-shaped light guide portion 31, is totally reflected by a lens cut (not shown) formed on the opposite surface 31*b* of the emission surface 31*a*, and is emitted from the emission surface 31*a* (mainly from the rectangular area B2 in FIG. 2(*b*)).

On the other hand, relatively bright light Ray2*a* (light within a half-value angle of 60 degrees) on one side (the outer side in the vehicle width direction) with respect to the optical axis AX21A of the first light source 21A in a top view among the light from the first light source 21A that has entered from the incident surface 33 is first totally reflected by the one side surface 32*a* (first total reflection surface 32*a*1) and then, in this order, totally reflected by the other side surface 32*b* (second total reflection surface 32*b*), after which the light travels toward one edge of the first plate-shaped light guide portion 31, enters the first plate-shaped light guide portion 31 through its edge, is guided within the first plate-shaped light guide portion 31, where it is totally reflected by a lens cut (not shown) formed on the opposite surface 31*b* of the emission surface 31*a*, and is emitted from the emission surface 31*a* (from the rectangular area B2 in FIG. 2(*b*)).

Similarly, relatively dim light Ray2*b* (light outside a half-value angle of 60 degrees) on one side (the outer side in the vehicle width direction) with respect to the optical axis AX21A of the first light source 21A in a top view is first totally reflected by the one side surface 32*a* (first total reflection surface 32*a*1) and then, in this order, totally reflected by the other side surface 32*b* (second total reflection surface 32*b*), after which the light travels toward one edge of the first plate-shaped light guide portion 31, enters the first plate-shaped light guide portion 31 through its edge, is guided within the first plate-shaped light guide portion 31, where it is totally reflected by a lens cut (not shown) formed on the opposite surface 31*b* of the emission surface 31*a*, and is emitted from the emission surface 31*a* (from the rectangular area B1 in FIG. 2(*b*)).

As described above, the DRL lamp (or position lamp) is realized by the light Ray1*a*, Ray1*b*, Ray2*a*, and Ray2*b* emitted from the emitting surface 31*a*. In addition, uniform emission of the inner lens 30 (first plate-shaped light guide section 31) is realized by the light Ray1*a*, Ray1*b*, Ray2*a*, and Ray2*b* emitted from the emitting surface 31*a*.

The conditions for allowing the inner lens 30 (first plate-shaped light guide section 31) to emit light uniformly (or approximately uniformly) vary, for example, depending on the shape, size, and thickness of the inner lens 30 (first plate-shaped light guide section 31, etc.), the type and size of the light source 20, and the arrangement of vehicle lamp components (for example, the inner lens 30 and the light source 20). Therefore, it is difficult to express the conditions for allowing the inner lens 30 (first plate-shaped light guide section 31) to emit light uniformly (or approximately uniformly) in terms of specific numerical values or other concrete parameters.

However, by using predetermined simulation software, changing (adjusting) at least one of the conditions for uniformly (or approximately uniformly) emitting light from the inner lens 30 (first plate-shaped light guide section 31), and checking the emission state of the inner lens 30 (first plate-shaped light guide section 31) each time a change is made, it is possible to determine the conditions for uniformly (or approximately uniformly) emitting light from the inner lens 30 (first plate-shaped light guide section 31).

As described above, according to the present embodiment, it is possible to allow the inner lens to emit light uniformly (or substantially uniformly) even when a Lambertian light distribution light source 20 (20A, 20B) arranged in a concentrated manner at one location is used as the light source.

Figure 6:
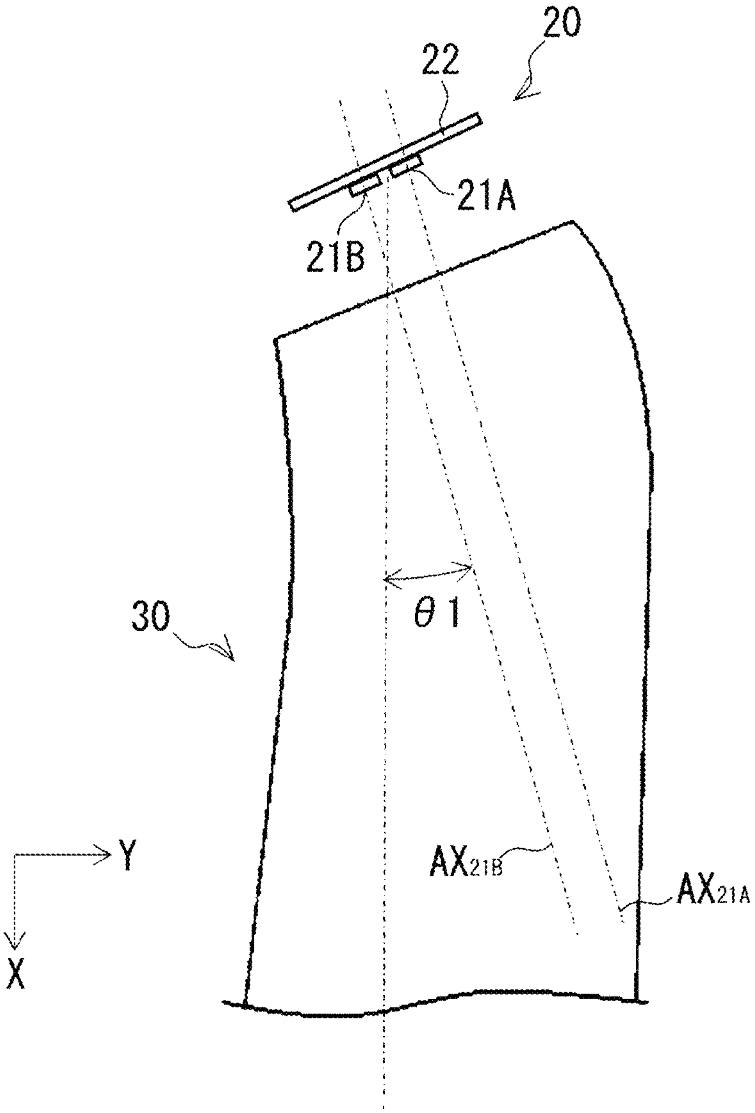
FIG. 6 is a partial enlarged view of a modification example of the vehicle lamp 10.

Next, a modification example will be described. FIG. 6 is a partial enlarged view of a modification example of the vehicle lamp 10.

In the above embodiment, an example was described in which the first light source 21A and the second light source 21B are arranged with a space in between in the Z direction (the thickness direction of the second plate-shaped light guide portion 32); however, the present invention is not limited thereto. For example, as shown in FIG. 6, the first light source 21A and the second light source 21B may be arranged with a space in between in the Y direction (a direction intersecting, for example, perpendicular to, the thickness direction of the second plate-shaped light guide portion 32).

In the above embodiment, an example was described in which two light sources (the first light source 21A and the second light source 21B) were used as light sources arranged in a concentrated manner at one location; however, the present invention is not limited thereto. For example, one or three or more light sources may be used as light sources arranged in a concentrated manner at one location.

In the above embodiment, an example was described in which the vehicle lamp of the present disclosure was applied to a vehicle signal lamp that functions as a DRL lamp, position lamp, or turn lamp; however, the present invention is not limited thereto. The vehicle lamp of the present disclosure may also be applied to vehicle signal lamps other than DRL lamps, position lamps, or turn lamps, as well as to vehicle headlamps, general lighting devices, and the like.

The numerical values described in the above-described embodiments are all illustrative, and appropriate numerical values different from the numerical values described in the above-described embodiments can be used as a matter of course.

The above embodiment is only an example in all respects. The present disclosure is not restrictively interpreted based on the descriptions about the above embodiment. The present disclosure can be carried out in various other forms without departing from the spirit and scope or the main features thereof.

What is claimed is:

1. A vehicle lamp comprising:

a light source;

a light guide which includes: a first plate-shaped light guide portion, which comprises an emission surface directed toward the light irradiation direction and an opposite surface on which a lens cut for extracting light is formed; a second plate-shaped light guide portion, which extends from one edge of the first plate-shaped light guide portion toward the light source and guides the light emitted from the light source to the edge of the first plate-shaped light guide portion; and an incident surface, which is provided at an end of the second plate-shaped light guide portion facing the light source and into which the light from the light source enters; wherein the second plate-shaped light guide portion includes one side surface, which is disposed on one side with respect to the optical axis of the light source, and the other side surface, which is disposed on the other side with respect to the optical axis of the light source, the one side surface includes a first side surface, which is disposed close to the incident surface, and a second side surface, which is disposed far from the incident surface, the first side surface extends from one side of the incident surface toward the edge of the first plate-shaped light guide portion, intersects with the optical axis of the light source when viewed in a plate-thickness direction of the second plate-shaped light guide portion, and is a first total reflection surface that totally reflects, toward the other side surface, the relatively bright light on one side with respect to the optical axis of the light source, among the light from the light source that has entered from the incident surface, the second side surface extends, when viewed in the plate-thickness direction of the second plate-shaped light guide portion, from one side of the incident surface along the optical axis of the light source to one side of the edge of the first plate-shaped light guide portion, so that light from the light source that has entered from the incident surface is guided within the second plate-shaped light guide portion directly to the edge of the first plate-shaped light guide portion without being incident on the second side surface, the other side surface is a second total reflection surface that totally reflects, toward one edge of the first plate-shaped light guide portion, the totally reflected light from the first total reflection surface, the relatively bright light on one side with respect to the optical axis of the light source among the light from the light source that has entered from the incident surface is first totally reflected by the first total reflection surface and then, in this order, totally reflected by the second total reflection surface, after which the light enters the first plate-shaped light guide portion through the edge of the first plate-shaped light guide portion, is guided within the first plate-shaped light guide portion, where it is totally reflected by a lens cut formed on the opposite surface of the emission surface, and is emitted from the emission surface, and the relatively bright light on the other side with respect to the optical axis of the light source among the light from the light source that has entered from the incident surface enters the first plate-shaped light guide portion through the edge of the first plate-shaped light guide portion, is guided within the first plate-shaped light guide portion, where it is totally reflected by a lens cut formed on the opposite surface of the emission surface, and is emitted from the emission surface.

2. The vehicle lamp according to claim 1, wherein the light source includes at least two light sources that emit different light colors and are arranged in the thickness direction of the second plate-shaped light guide portion.

3. The vehicle lamp according to claim 1, wherein the light source includes at least two light sources that emit different light colors and are arranged in a direction intersecting the thickness direction of the second plate-shaped light guide portion.

* * * * *